United States Patent
Armstrong et al.

(10) Patent No.: US 9,983,066 B1
(45) Date of Patent: May 29, 2018

(54) SYSTEM AND METHOD FOR HIGH SENSITIVITY SPECTROMETER WITH HIGH TIME RESOLUTION

(71) Applicant: Lawrence Livermore National Security, LLC, Livermore, CA (US)

(72) Inventors: Michael Robert Armstrong, Livermore, CA (US); Harry B. Radousky, San Leandro, CA (US); Joseph Zaug, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days. days.

(21) Appl. No.: 15/696,704

(22) Filed: Sep. 6, 2017

(51) Int. Cl.
*G01J 3/28* (2006.01)
*G01J 9/00* (2006.01)
*G01J 3/02* (2006.01)

(52) U.S. Cl.
CPC .............. *G01J 9/00* (2013.01); *G01J 3/0218* (2013.01); *G01J 3/2803* (2013.01)

(58) Field of Classification Search
CPC ........ G01J 9/00; G01J 3/02; G01J 3/28; G01J 3/18
See application file for complete search history.

(56) References Cited

U.S. PATENT DOCUMENTS

2014/0092385 A1* 4/2014 Nitkowski ............... G01J 3/18
356/326

* cited by examiner

*Primary Examiner* — Abdullahi Nur
(74) *Attorney, Agent, or Firm* — Harness & Dickey, PLC

(57) ABSTRACT

A system for high sensitivity, high time resolution detection of an arbitrary spontaneous emission is disclosed. The system may use a local oscillator (LO) for generating an LO input optical signal, and an linear optical mixer for receiving and mixing the input optical signal and an arbitrary spontaneous emission. The 2D detector generates a first component output and a second component. A subsystem receives the component outputs and produces first and second dispersed spectrum output signals. At least a first ultra-high speed camera is used for imaging one of the first or second dispersed spectrum output signals.

21 Claims, 3 Drawing Sheets

SYSTEM AND METHOD FOR HIGH SENSITIVITY SPECTROMETER WITH HIGH TIME RESOLUTION

FIELD

The present disclosure relates to optical detectors, and more particularly to a system and method for utilizing optical mixing to enable high sensitivity detection of an arbitrary and spontaneous emission from an optical source.

BACKGROUND

This section provides background information related to the present disclosure which is not necessarily prior art.

A significant challenge with using conventional optical heterodyne or homodyne mixing to detect an arbitrary spontaneous emission is in generating a local oscillator that is coherent with the signal to be detected. Due to the random nature of spontaneous emission, it is impossible to create a local oscillator that is temporally coherent, and thus can constructively mix, allowing heterodyne/homodyne detection, with an arbitrary, spontaneously emitted signal. Since coherence time is inversely proportional to the bandwidth of the detected signal, typical coherence times for broadband emission are extremely short (<picosecond time scales), implying that coherent mixing may only be achieved with picosecond time scale detection, which is not possible with currently available electronic detection technology.

SUMMARY

This section provides a general summary of the disclosure, and is not a comprehensive disclosure of its full scope or all of its features.

In one aspect the present disclosure relates to a system for high sensitivity, high time resolution detection of an arbitrary spontaneous emission. The system may comprise a local oscillator (LO) for generating an LO input optical signal, and a linear optical mixer for receiving and mixing the input optical signal and an arbitrary spontaneous emission to produce a mixed signal. The linear optical mixer may be configured to detect a phase difference between the arbitrary spontaneous emission and the input optical signal, and to generate a first component output and a second component output from the mixed signal. A system may also include a subsystem which receives the first and second component outputs and generates a first dispersed spectrum output signal and a second dispersed spectrum output signal. The first dispersed spectrum output signal represents a quadrature sum of the first component output and the LO input optical signal. The second dispersed spectrum output signal represents an in-phase sum of the second component output and the LO input optical signal. The system may further include at least a first ultra-high speed camera for imaging one of the first or second dispersed spectrum output signals.

In another aspect the present disclosure may comprise a system for high sensitivity, high time resolution detection of an arbitrary spontaneous emission. The system may comprise a local oscillator (LO) for generating an LO input optical signal, and a linear optical mixer for receiving and mixing the input optical signal and an arbitrary spontaneous emission to produce a mixed signal. The linear optical mixer may be configured to detect a phase difference between the arbitrary spontaneous emission and the input optical signal, and to generate a first phase component output and a second component output from the mixed signal. A spectrometer system may be included for receiving the first and second component outputs and generating a first dispersed spectrum output signal and a second dispersed spectrum output signal. The first dispersed spectrum output signal may represent a quadrature sum of the first component output and the LO input optical signal. The second dispersed spectrum output signal may represent an in-phase sum of the second component output and the LO input optical signal. The first ultra-high speed camera receives and creates an image of the first dispersed spectrum output signal, and the second ultra-high speed camera receives and produces an image of the second dispersed spectrum output signal.

In still another aspect the present disclosure relates to a method for high sensitivity, high time resolution detection of an arbitrary spontaneous emission. The method may comprise using a local oscillator (LO) to generate an LO input optical signal, and using a linear optical mixer to receive and mix the input optical signal together with an arbitrary spontaneous emission to produce a mixed signal. The linear optical mixer detects a phase difference between the arbitrary spontaneous emission and the input optical signal and generates a first component output and a second component output from the mixed signal. The method further may include using a subsystem adapted to receive the first and second component outputs to create a first dispersed spectrum output signal and a second dispersed spectrum output signal. The first dispersed spectrum output signal may represent a quadrature sum of the first component output and the LO input optical signal. The second dispersed spectrum output signal may represent an in-phase sum of the second component output and the LO input optical signal. The method may also include capturing an image of at least one of the first or second dispersed spectrum output signals.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
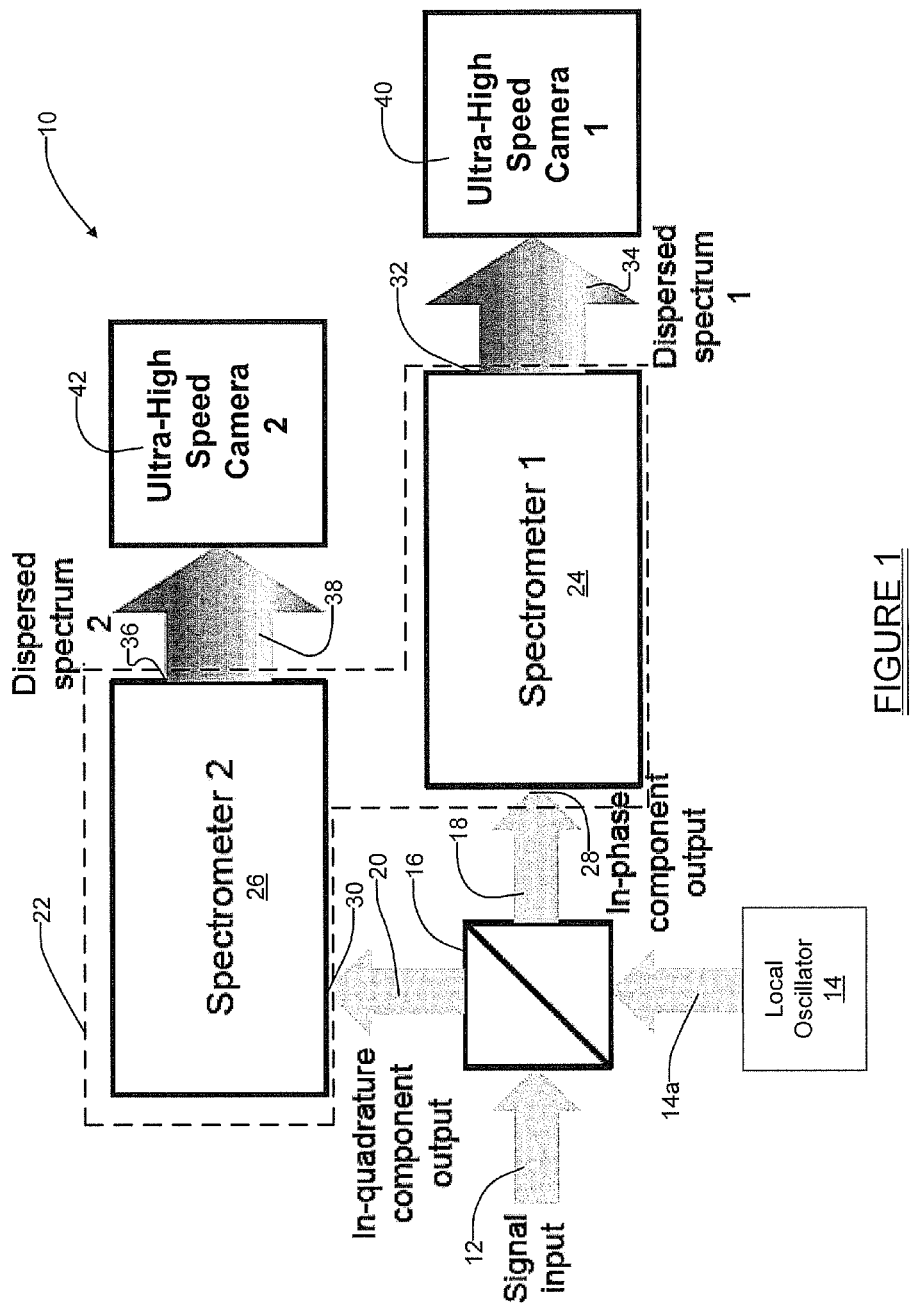
FIG. 1 is a high level block diagram of one embodiment of a system for high sensitivity detection of an arbitrary and spontaneous emission from an optical source.
Figure 3:
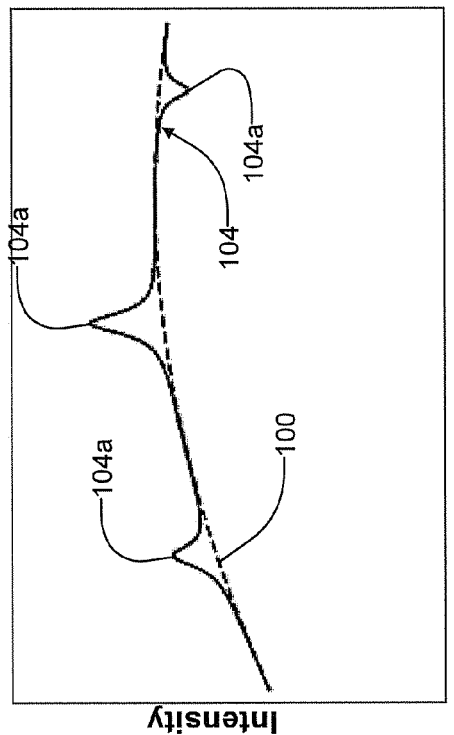
Figure 4:
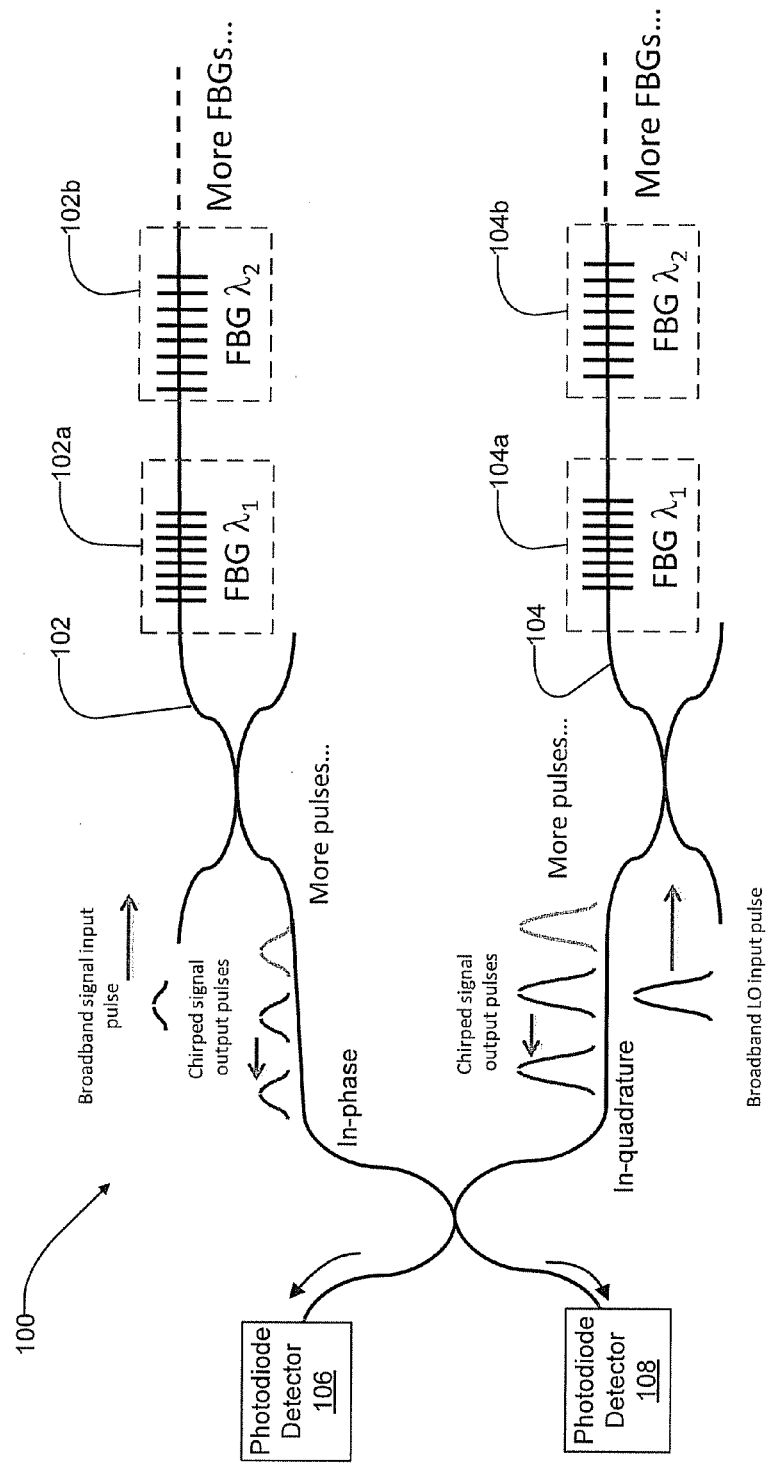

FIG. 3 is a graph showing a typical example of the intensity peaks of the second dispersed spectrum output signal which might be imaged by the second camera of FIG. 1, and the LO input optical signal in dashed line; and FIG. 4 shows another embodiment of a system in accordance with the present disclosure in the form of a chirped optical fiber system, where a plurality of fiber bragg gratings are spaced along each one of a pair of optical fibers.

Corresponding reference numerals indicate corresponding parts throughout the several views of the drawings.

DETAILED DESCRIPTION

Example embodiments will now be described more fully with reference to the accompanying drawings.

The above described detection limitation may be overcome by the use of recently developed ultra-high speed cameras combined with a conventional large grating spectrometer. A spectrometer divides an incoherent optical signal into several independent wavelength resolved signals, each with an intrinsically longer coherence time than the input signal. The output coherence time may be substantially larger, and is determined by the resolution of the spectrometer. For a spectrometer with a 10-20 cm width grating, the coherence time may be as high as ~1 ns, which is a detection time within the reach of modern time-resolved imaging cameras. Thus, by using a large grating spectrometer and detecting in a short time window, consistent with the coherence time of the spectrometer, optical mixing (heterodyne or homodyne detection) may be obtained with high sensitivity.

Optical Mixing (Heterodyne or Homodyne Detection)

An optical signal is typically detected as optical power per unit area (intensity) averaged over some detection time:

$$I_d(t) \propto \int_{t-\Delta t}^{t} I(t')dt'/\Delta t \equiv \langle I(t) \rangle$$

where $\Delta t$ is the detection time, $I_d(t)$ is the detected intensity, and brackets denote a time average.

By definition the intensity is the squared absolute value of the electric field:

$$I(t) = |E(t)|^2 = E(t)E^*(t)$$

which is often written as the product of a slowly varying amplitude modulated by a rapidly varying component (the "carrier" frequency), whose frequency for optical signals ranges from 430-750 THz, i.e.:

$$E(t) = E_0(t)e^{-2\pi i v_0 t}$$

where $E_0$ is slowly varying amplitude and $v_0$ is the carrier frequency of the optical signal.

Optical mixing is achieved when two optical signals representing input beams (e.g., two laser beams) are overlapped on a partially reflecting mirror. This results in output signals that are the sum of the input beams (in this case we assume a 50/50 beamsplitter with no phase shift between the beams from the beamsplitter):

$$E_{out} = E_s + E_{LO}$$

where $E_s$ is a weak optical signal to be detected, and $E_{LO}$ is a relatively strong optical signal (the "local oscillator") which increases sensitivity for intensity ("square-law") detectors, i.e.:

$$I_{out} = |E_{out}|^2 = |E_{LO}|^2 + |E_s|^2 + E_{LO}E_s^* + E_sE_{LO}^* \cong I_{LO} + E_{LO}E_s^* + E_sE_{LO}^*$$

where $I_s = |E_s|^2 \cong 0$, and the total intensity is the sum of the intensity of the local oscillator and "cross terms" due to mixing between the local oscillator and the weak optical signal ($E_s$). It should be noted immediately that, compared to the intensity of the weak optical signal ($E_s$) with no local oscillator, $I_s$, the amplitude of the contrast signal, $I_{out} - I_{LO}$, is larger by a factor of:

$$G = 2|E_{LO}|/|E_s|$$

where G is referred to as the heterodyne (or homodyne) gain. Depending on the noise level and dynamic range of the detector, this gain can range up to several orders of magnitude. The contrast signal is typically detected in this mixing scheme and the associated gain is what makes a local oscillator mixing detection scheme substantially more sensitive than direct detection of the signal.

Generally, for arbitrary broadband optical signals, the coherence time is much shorter than the detection time achievable by modern electronic detectors (in the 10 femtosecond range) which makes high sensitivity detection using mixing of broadband optical signals impossible. Yet, a spectrometer is essentially a filter which separates a broadband optical signal into spatially separated narrowband frequency components, each with a substantially longer coherence time than the broadband input. In this case, corresponding frequency components of a weak arbitrary signal and the local oscillator signal may be coherently mixed over the inverse bandwidth of the spectrometer, which can range into the nanosecond regime.

Nanosecond-time resolution detection cameras have been recently developed. Thus, using a nanosecond detection camera in a conventional narrowband spectrometer will enable high sensitivity detection of arbitrary spontaneous emission, and importantly with nanosecond-time resolution. Further, if the local oscillator itself provides a ~nanosecond time scale pulse, a fast detection camera is not necessary.

FIG. 1 shows one embodiment of a system 10 for enabling high sensitivity, high time resolution detection of an arbitrary spontaneous emission. In this example an arbitrary weak input signal 12, along with a local oscillator ("LO") input signal 14a from a LO 14, are fed into a two dimensional ("2D"), linear optical mixer 16. In one implementation the linear optical mixer may be an optical beam splitter. Since, at a given wavelength, the phase difference between any two arbitrary optical signals is unknown, both outputs from a mixing scheme must be independently detected to obtain both in-phase and in-quadrature component output parts of the mixed signal. Generally, this is possible using the linear optical mixer 16, where the two outputs from the mixing scheme are detected at two different vertical positions on the same detector (with the spectrum dispersed along the other direction) by two independent spectrometers, or a single 2D spectrometer independently detecting the two signals from the linear mixer. Thus, the linear optical mixer 16 mixes portions of the input signal 12 and the LO input signal 14 to produce a mixed, in-phase component output 18, and an in-quadrature component output 20. Alternatively, instead of two independent spectrometers, a single 2D spectrometer could be used to independently detect the two signals from the liner optical mixer 16.

The in-phase component 18 and the in-quadrature component 20 are fed into a spectrometer system 22. In this example the spectrometer system 22 may have a first spectrometer 24 and a second spectrometer 26. In one example each spectrometer 24 and 26 has may have about a 10 cm-20 cm width grating. The in-phase component output 18 is fed into an input 28 of the first spectrometer 24, while the in-quadrature component output 20 is fed into an input 30 of the second spectrometer 26. The first spectrometer 24 produces at its output 32 a first dispersed spectrum output signal 34, while the second spectrometer 26 produces at its output 36 a second dispersed spectrum output signal 38. The first dispersed spectrum output signal 34 is fed into a first ultra-high speed camera 40, while the second dispersed spectrum output signal 38 is fed into a second ultra-high speed camera 42. Ultra-high speed cameras suitable for this application are commercially available from, for example, Stanford Computer Optics, Inc. of Berkeley, Calif. This may also potentially be accomplished with a short time duration emission signal from, for example, pulsed laser induced fluorescence, and a short local oscillator (LO) signal, where the duration of the LO signal is less than the coherence time of the spectrometer output. The use of high speed cameras is principally only to prevent the detection time of the mixed signal from exceeding the coherent time of the output of the spectrometer (which can also be done by limiting the duration of the LO signal).

Figure 2:
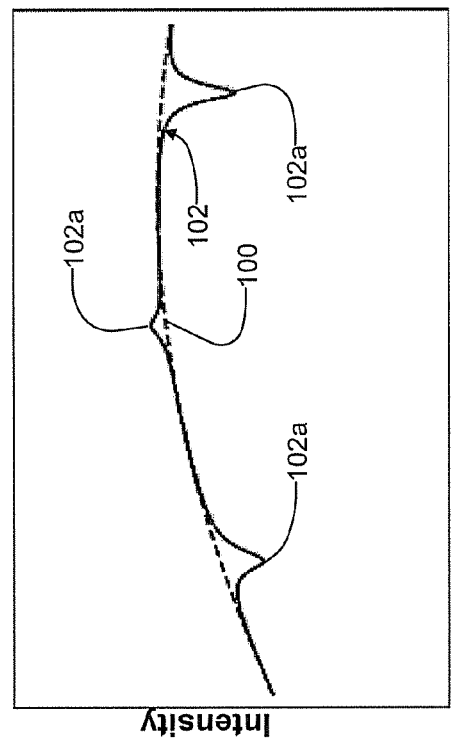
FIG. 2 is a graph showing a typical example of the intensity peaks of the first dispersed spectrum output signal which might be imaged by the first camera in FIG. 1, and the local oscillator (LO) input optical signal in dashed line.

FIGS. 2 and 3 show graphical representations of the output signals 34 and 38 from the first and second spectrometers 24 and 26, respectively. In FIGS. 2 and 3, dashed waveform 100 represents the LO spectrum, (i.e., input signal 14a) from FIG. 1, and the solid waveform 102 represents the in-quadrature part of the spectrum 34 of the mixed signal 12 and the LO input signal 14a. Similarly, in FIG. 3 the dashed waveform line 100 represents the LO input signal 14a and the solid waveform line 104 represents the in-phase part of the spectrum 38 of the mixed LO input signal 14a and the signal 12. The relative intensities of corresponding peaks 102a in FIG. 2 and peaks 104a in FIG. 3 give the optical phase difference between the mixed signal (i.e., either signal component 18 or 20 from FIG. 1) and the local oscillator input signal 14a for the corresponding wavelength.

In another embodiment, which forms an even more compact system, the two spectrometers 26 and 30 could be replaced by chirped optical fiber. This embodiment is illustrated with system 100 in FIG. 4. In this example two fiber bragg gratings (FBGs) 102a and 102b are spaced along optical fiber 102, while fiber bragg gratings 104a and 104b are spaced along optical fiber 104. In practice, however, there typically could be many more fiber bragg gratings (e.g., possibly hundreds to thousands) spaced along each optical fiber 102 and 104. The underlying principle of operation is to take a short (e.g., 1 ns) optical pulse and resolve it in to a stream of many delayed pulses along each optical fiber 102 and 104, with each delayed pulse being spaced in time and wavelength. This way, a single, time resolved photodiode 106 and 108 at each optical fiber 102 and 104 output (in-phase and in-quadrature) can be used to obtain the entire spectrum in a time trace.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for high sensitivity, high time resolution detection of an arbitrary spontaneous emission, the system comprising:
   a local oscillator (LO) for generating an LO input optical signal;
   a linear optical mixer for receiving and mixing the LO input optical signal and an arbitrary spontaneous emission to produce a mixed signal, the linear optical mixer being configured to detect a phase difference between the arbitrary spontaneous emission and the LO input optical signal, and to generate a first component output and a second component output from the mixed signal;
   a subsystem for receiving the first and second component outputs and generating a first dispersed spectrum output signal and a second dispersed spectrum output signal;
   the first dispersed spectrum output signal representing a quadrature sum of the first component output and the LO input optical signal;
   the second dispersed spectrum output signal representing an in-phase sum of the second component output and the LO input optical signal; and
   at least a first ultra-high speed camera for imaging one of the first or second dispersed spectrum output signals.

2. The system of claim 1, further comprising a second ultra-high speed camera; and
   wherein the first ultra-high speed camera receives and creates an image of the first dispersed spectrum output signal; and
   wherein the second ultra-high speed camera receives and produces an image of the second dispersed spectrum output signal.

3. The system of claim 1, wherein the first component output comprises an in-phase component output.

4. The system of claim 3, wherein the second component output comprises an in-quadrature component output.

5. The system of claim 4, wherein the subsystem comprises a first spectrometer and a second spectrometer, the first spectrometer receiving the in-phase component output and generating the first dispersed spectrum output signal, and the second spectrometer receiving the in-quadrature component output and generating the second dispersed spectrum output.

6. The system of claim 5, wherein the first spectrometer receives the in-phase component output and produces the first dispersed spectrum output, and the second spectrometer receives the in-quadrature component and produces the second dispersed spectrum output.

7. The system of claim 5, wherein at least one of the first and second spectrometers includes a grating width of between 10 cm-20 cm.

8. The system of claim 1, wherein the subsystem comprises a chirped optical fiber.

9. The system of claim 1, wherein the linear optical mixer comprises an optical beam splitter.

10. A system for high sensitivity, high time resolution detection of an arbitrary spontaneous emission, the system comprising:
    a local oscillator (LO) for generating an LO input optical signal;
    a linear optical mixer for receiving and mixing the LO input optical signal and an arbitrary spontaneous emission to produce a mixed signal, the linear optical mixer being configured to detect a phase difference between the arbitrary spontaneous emission and the input optical signal, and to generate a first phase component output and a second component output from the mixed signal;
    a spectrometer system for receiving the first and second component outputs and generating a first dispersed spectrum output signal and a second dispersed spectrum output signal;
    the first dispersed spectrum output signal representing a quadrature sum of the first component output and the LO input optical signal;
    the second dispersed spectrum output signal representing an in-phase sum of the second component output and the LO input optical signal;
    a first ultra-high speed camera, which receives and creates an image of the first dispersed spectrum output signal; and
    a second ultra-high speed camera, which receives and produces an image of the second dispersed spectrum output signal.

11. The system of claim 10, wherein the linear optical mixer comprises an optical beam splitter.

12. The system of claim 10, wherein the second component output comprises an in-quadrature component output.

13. The system of claim 10, wherein the spectrometer system includes first and second spectrometers, and wherein each of the first and second spectrometers includes a grating width of between 10 cm-20 cm.

14. A method for high sensitivity, high time resolution detection of an arbitrary spontaneous emission, comprising:
using a local oscillator (LO) to generate an LO input optical signal;
using a linear optical mixer to receive and mix the LO input optical signal together with an arbitrary spontaneous emission to produce a mixed signal, the linear optical mixer further detecting a phase difference between the arbitrary spontaneous emission and the LO input optical signal and generating a first component output and a second component output from the mixed signal;
using a subsystem adapted to receive the first and second component outputs to create a first dispersed spectrum output signal and a second dispersed spectrum output signal;
the first dispersed spectrum output signal representing a quadrature sum of the first component output and the LO input optical signal;
the second dispersed spectrum output signal representing an in-phase sum of the second component output and the LO input optical signal; and
capturing an image of at least one of the first or second dispersed spectrum output signals.

15. The method of claim 14, wherein using a subsystem comprises using a spectrometer system to receive the first and second component outputs and to generate the first and second dispersed spectrum output signals.

16. The method of claim 15, wherein using a spectrometer system comprises:
using a first spectrometer to receive the first component output and to generate the first dispersed spectrum output signal; and
using a second spectrometer to receive the second component output and to generate the second dispersed spectrum output signal.

17. The method of claim 16, wherein:
using a first spectrometer comprises using a first spectrometer having a grating width of between 10 cm-20 cm; and
using a second spectrometer comprises using a second spectrometer having a grating width of between 10 cm-20 cm.

18. The method of claim 14, linear optical mixer comprises an optical beamsplitter.

19. The method of claim 14, wherein using a subsystem comprises using a chirped optical fiber.

20. The method of claim 14, wherein capturing an image comprises using at least one ultra-high speed camera.

21. The method of claim 14, wherein capturing an image comprises:
using a first ultra-high speed camera to receive the first dispersed spectrum output and capture a first image representative of the first dispersed spectrum output; and
using a second ultra-high speed camera to receive the second dispersed spectrum output to capture a second image representative of the second dispersed spectrum output.

\* \* \* \* \*